(12) United States Patent
Welterlen

(10) Patent No.: US 6,959,269 B1
(45) Date of Patent: Oct. 25, 2005

(54) METHOD AND SYSTEM FOR SIMULATING AN UNSTEADY FLOW FIELD

(75) Inventor: Tracy J. Welterlen, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 908 days.

(21) Appl. No.: 09/839,463

(22) Filed: Apr. 20, 2001

(51) Int. Cl.$^7$ ............................................... G06G 7/48
(52) U.S. Cl. .................. 703/8; 703/2; 703/6; 703/7; 703/9; 714/38; 714/739; 714/718
(58) Field of Search ................................ 703/2, 6, 7, 8, 703/9; 89/1.51; 244/117 R

(56) References Cited

U.S. PATENT DOCUMENTS

| | | | |
|---|---|---|---|
| 5,838,588 A * | 11/1998 | Santoso et al. ............. | 700/287 |
| 5,910,902 A * | 6/1999 | Molvig et al. .................. | 703/6 |
| 5,926,399 A * | 7/1999 | Berkooz et al. ............... | 703/7 |
| 6,088,521 A * | 7/2000 | Strumolo et al. ............. | 703/8 |
| 6,266,071 B1 * | 7/2001 | Stam et al. .................. | 345/473 |
| 6,285,968 B1 * | 9/2001 | Motoyama et al. ............ | 703/1 |
| 6,654,710 B1 * | 11/2003 | Keller ............................ | 703/9 |

OTHER PUBLICATIONS

UFAT—A Particle Tracer for Time-Dependent Flow Fields, D. Lane, IEEE 1070-2385/94, 1994 IEEE.*
"An Implicit Upward Algorithm for Computing Turbulent Flows of Unstructured Grid", W.K. Anderson et al, Computer Fluids, vol. 23, No. 1, pp. 1-21, 1994.*
"Visualization of Time-Dependent Flow Fields", D. Lane, IEEE 1070-2385/93, 1993 IEEE.*
"Unsteady Flow Volumes", B. G. Becker et al, Proceedings VISUALIZATION '95, pp. 329-335.*
"NREC News", J.H. Watts, vol. 12, Issue 1, Spring 1998.*
"FieldView 7", Press Release, Oct. 2000, Intelligent Light, Inc.*
"Visualization of High Speed Aerodynamic Configuration Design", M. Hannemann, Proceedings VISUALIZATION '95, pp. 355-358.*
Review of Parametric Technology Corporation Pro/ENGINEER 2000, J. MacKrell, CIMdata Inc. 1999.*
"PowerFLOW Specification" Product Description, Exa Corp. 1999.*
"Flow Visualization in Hypersonic Fin/Ramp Flow", H. Pagendarm, Proceedings VISUALIZATION 95, IEEE 1995.*
G. A. Howell; "Store Separation Test and Analysis Techniques Employed On the F-22 Program;" 76th AGARD Fluid Dynamics Panel Meeting and Symposium; all, Apr. 24-28, 1995.

* cited by examiner

Primary Examiner—Jean R. Homere
Assistant Examiner—Fred Ferris
(74) Attorney, Agent, or Firm—Baker Botts L.L.P.

(57) ABSTRACT

A system and method for simulating a flow field are disclosed. A grid having cells is generated. Each cell is associated with a set of variables that describe a flow field. A value for each variable of each cell is calculated from a previous value at each period for a predetermined number of periods. The calculated values for each variable are averaged to yield an averaged value for each variable. A flow field is determined from the averaged values.

23 Claims, 3 Drawing Sheets

METHOD AND SYSTEM FOR SIMULATING AN UNSTEADY FLOW FIELD

TECHNICAL FIELD OF THE INVENTION

This invention relates generally to the field of simulation systems and more specifically to a method and system for simulating a flow field.

This invention was made with Government support under Contract No. F33615-96-D-3000 awarded by The Department of the Air Force. The Government has certain rights in this invention.

BACKGROUND OF THE INVENTION

Simulating the flow field around an aircraft transporting a store, such as a weapon, is important for the design of aircraft. Increasingly, modern aircraft transport their store internally within a closed bay. The bay is opened to deploy the store over a target. As the bay is opened, the flow field around the aircraft affects the deployment of the store, and may become unsteady around the open bay. Typically, the flow field is simulated to determine the effect of deployment of the store on the aircraft.

Simulating the flow field around an aircraft, however, has posed challenges to aircraft designers. Wind tunnels may be used to simulate a flow field. Scale models of the aircraft are placed in a wind tunnel, and measurements of the flow field created in the wind tunnel are taken. The results from wind tunnel simulations, however, are often distorted since the size and mass of the scale model are different from that of the actual aircraft. Additionally, wind tunnel simulation is typically expensive. Computational simulations may also be used to determine the flow field. Calculating the flow field around an aircraft, especially an unsteady flow field, however, requires a large amount of computing power and time. Consequently, simulating the flow field around an aircraft has posed challenges to aircraft designers.

SUMMARY OF THE INVENTION

While recent developments in aircraft simulation have provided improvements over prior approaches, the challenges in the field of simulation systems have continued to increase with demands for more and better techniques having greater effectiveness and efficiency. Therefore, a need has arisen for an improved method and system for simulating a flow field.

In accordance with the present invention, a method and system for simulating a flow field are provided that substantially eliminate or reduce the disadvantages and problems associated with previously developed systems and methods.

According to one embodiment of the present invention, a method for simulating flow field is disclosed. A grid comprising a plurality of cells is provided. Each cell is associated with a set of variables that describe a flow field. For each cell, a value for each variable is calculated from a previous value at each period for a predetermined number of periods. The calculated values for each variable are averaged to yield an averaged value for each variable. A flow field is determined from the averaged values.

According to one embodiment of the present invention, a system for simulating a flow field is disclosed. A grid generator generates a grid comprising a plurality of cells. Each cell is associated with a set of variables for describing a flow field. A flow field module is coupled to the grid generator. The flow field module calculates a value for each variable from a previous value at each period for a predetermined number of periods. An averaging module is coupled to the flow field module. The averaging module averages the calculated values for each variable to yield an averaged value for each variable.

Embodiments of the invention may provide numerous technical advantages. A technical advantage of one embodiment is that values describing the flow field are averaged to smooth out instabilities, resulting in an accurate flow field simulation that uses relatively little computing power and time. Another technical advantage of one embodiment is that the values calculated using a time-warped process may be averaged in order to produce a simulation of sufficient accuracy, while using relatively little computing power and time.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1A:
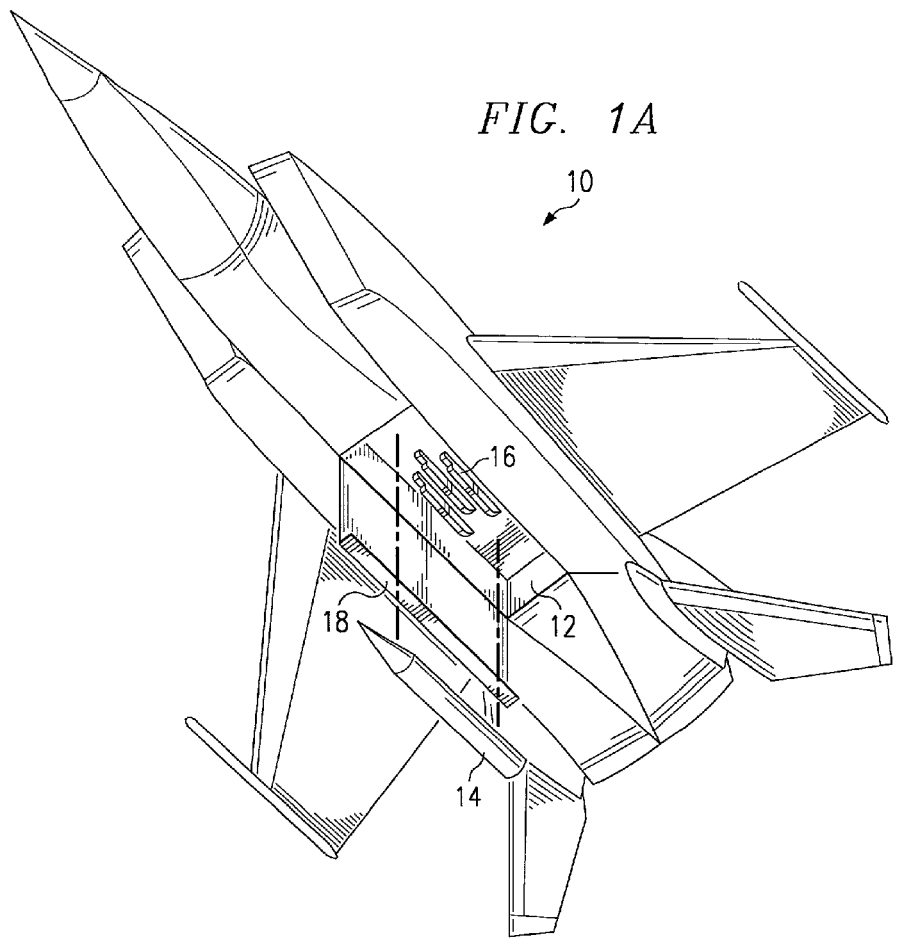
FIG. 1A illustrates an object for which a flow field may be simulated.
Figure 2:
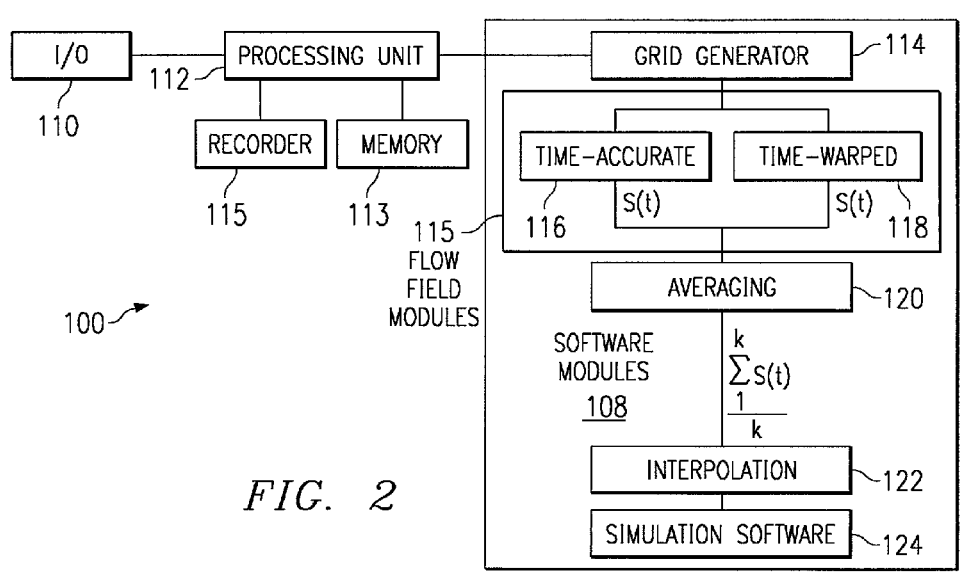
FIG. 2 is a block diagram of a system for simulating a flow field in accordance with the present invention.
Figure 3:
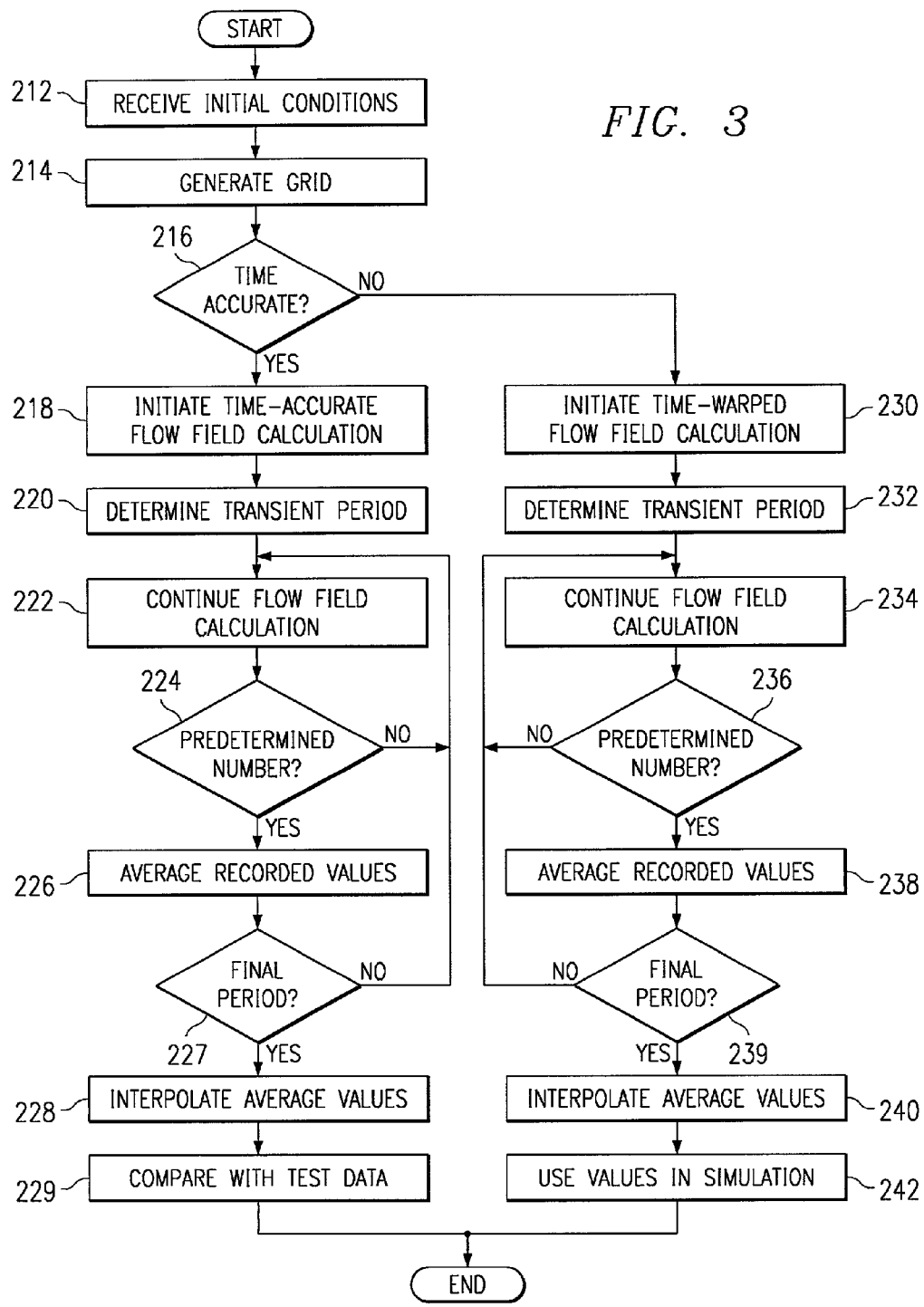
FIG. 3 is a flowchart demonstrating a method for simulating a flow field in accordance with the present invention.

Embodiments of the present invention and its advantages are best understood by referring to FIGS. 1 through 3 of the drawings, like numerals being used for like and corresponding parts of the various drawings.

FIG. 1A illustrates an example of an object for which a flow field may be simulated by the present invention. A flow field includes any fluid such as air or water, and an object includes any suitable solid in a flow field, for example, an aircraft 10 such as an F-22 Raptor. Aircraft 10 includes a bay 12 used to transport and deploy a store 14 such as a weapon. Store 14, however, may include any object transported and deployed by aircraft 10, such as cargo. Bay 12 includes ejectors 18 that eject store 14 over a desired target. Bay 12 includes a door 16 that typically is closed during transportation of store 14 and opened to deploy store 14. To simulate a flow field for aircraft 10, an electronic representation of aircraft 10 is generated using, for example, ACAD or other suitable solid modeling software program.

Figure 1B:
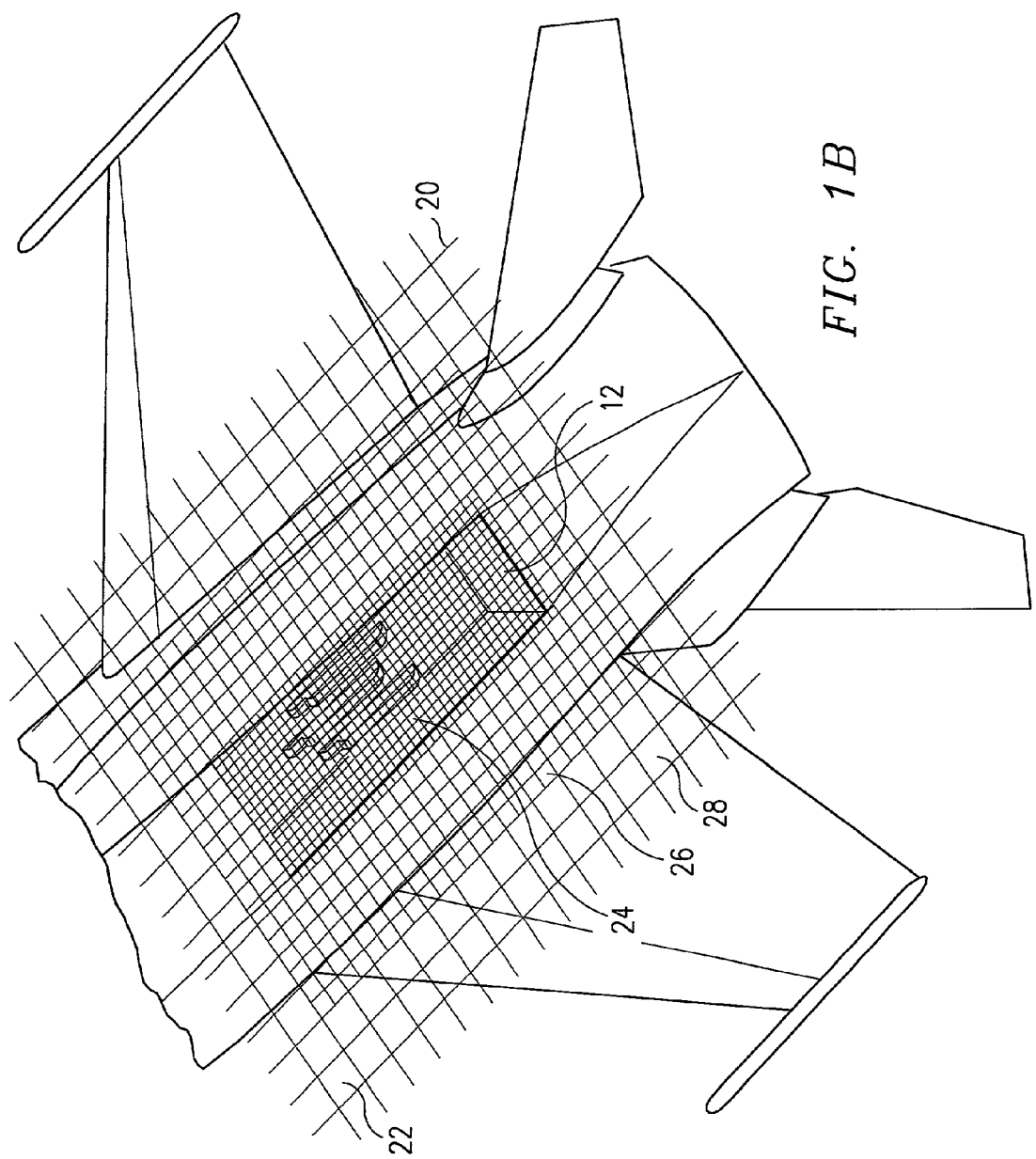
FIG. 1B illustrates a grid used to simulate a flow field in accordance with the present invention.

FIG. 1B illustrates a grid 20 for aircraft 10 used to generate a flow field simulation. Grid 20 comprises cells 22 $c_1, \ldots c_n$ that are illustrated as squares of grid 20. Each cell 22 $c_i$ is associated with a set of Q-variables $Q_1, \ldots, Q_m$ that describe the flow field at the cell 22. "Each" as used in this document means each member of a set or each member of a subset of the set. Q-variables may include, for example, velocity variables such as an axial velocity variable, a transverse velocity variable, and a vertical velocity variable, a pressure variable, and a temperature variable. Q-variables, however, may include any variables suitable for describing a flow field, such as momentum variables, a density variable, and an energy variable. Each variable $Q_k(t)$ takes on values $q_{kt}$ that describe the variable at a particular time t. For example, velocity values, a pressure value, and a temperature value describe the velocity, pressure, and temperature at a particular time.

Grid 20 includes cells 22 of varying sizes. Larger cells may be used to describe regions with variables that change slowly, and smaller cells 22 may be used to describe regions with variables that change rapidly. For example, small cells 24 are used to describe the region inside bay 12 that has a complicated structure where the variables change relatively rapidly. Approximately 160 cells 24 may span bay 12 in the axial direction, and approximately 45 cells 24 may span bay 12 in the lateral direction. Medium sized cells 26 are used to describe the regions just outside of bay 12, where variables change less rapidly. Large cells 28 are used to describe the regions far from bay 12, where variables change relatively slowly.

The sizes of cells 22 are adjusted as the flow field changes. For example, grid 20 is generated for a closed bay 12, that is, bay 12 with door 16 closed, or for an open bay 12. Since a closed bay 12 has simpler geometry, grid 20 for closed bay 12 includes, for example, approximately 500,000 cells 22, whereas grid 20 for open bay 12 includes, for example, approximately 1,000,000 cells 22.

FIG. 2 illustrates a system 100 for simulating a flow field for an object. System 100 may use any suitable configuration of components, software, and/or hardware to simulate a flow field for an object. In the illustrated examples, system 100 includes an input-output (I/O) 110 that receives initial conditions for calculating a flow field, and outputs values for a flow field simulation. A processing unit 112 coupled to input-output 110 manages the process of and provides computational power for simulating a flow field. Processing unit 112 includes, for example, a combination of Hewlett-Packard V-class and X-class machines using eight to sixteen processors, or any other suitable combination of machines and processors. A memory 113 coupled to processing unit 112 stores data during the simulation. A recorder 115 coupled to memory 113 records data in memory 113 in the form of reusable magnetic media.

Software modules 108 perform calculations for simulating a flow field. A grid generator 114 coupled to processing unit 112 generates and adjusts grid 20 for aircraft 10. Grid 20 is generated with cells 22 $c_i$ suitably sized to sufficiently describe the flow field for aircraft 10. The sizes of cells 22 may also be adjusted as the flow field changes in time. Grid generator 114 includes computer aided design software such as PRO ENGINEER by PTC, INC.

Flow field modules 115, such as a time-accurate module 116 and a time-warped module 118 coupled to grid adapter 114, calculate the values $q_{kt}$ for the variables $Q_K(t)$ in order to determine a flow field at time t. Time-accurate module 116 and time-warped module 118 calculate the values by applying flow field functions, such as Navier-Stokes flow field equations, to values in a time t to determine the values at a time t+1. Flow field modules 115 include computational fluid dynamics (CFD) software such as FLUENT, by FLUENT, INC. Values for the variables are determined at every time step, and the values are periodically recorded after a predetermined number of time steps. For example, values are calculated approximately every $2.0 \times 10^{-5}$ seconds, and values are recorded at periods of every five time steps. The length of the time step is selected by balancing computation time with accuracy. A longer time step decreases computation time, but also decreases accuracy and numerical stability. If the desired time step can not be achieved during the initial calculation process, a shorter time step is used initially and then incrementally increased until it reaches the desired time step. Values are recorded as plot files stored in memory 113. Plot files describe, for example, cell locations and values at the cell locations.

Time-accurate module 116 determines the state of a flow field using a time-accurate process. Time-accurate module 116 calculates and records the values for all cells 22 at the same rate. Time-warped module 118 determines the state of the flow field using a time-warped process. Time-warped module 118 determines and records the values for different cells 22 at different rates. For example, values of larger cells 28 are determined and recorded at a rate faster than the rate for values of smaller cells 24.

Averaging module 120 coupled to time-accurate module 116 and time-warped module 118 receives recorded values $q_{kt}$ from time-accurate module 116 or from time-warped module 118 and averages the values $q_{kt}$ for a predetermined number p of periods to yield averaged values $$\frac{1}{p}\sum^{p} q_{kt}.$$

For example, values $q_{1t}$ for Q-variable $Q_1$ recorded for p periods are averaged to yield averaged values $$\frac{1}{p}\sum^{p} q_{1t}$$

for Q-variable $Q_1$. Averaging the values smooth out instabilities in the values, resulting in more accurate data.

The number of periods is selected according to the accuracy of the recorded values and the desired accuracy. For example, averaging module 120 averages time-accurate values recorded for 200 to 400 periods. Averaging module 120 may average time-warped values recorded for approximately 30 to 40 periods. Averaging module 120 stores the averaged values in a plot file in memory 113. Averaging module 120 also gathers statistical information for the averaged values, such as standard deviation and root-mean-square values.

Interpolation module 122 coupled to averaging module 120 transforms the averaged values as associated with grid 20 to values associated with a survey grid, so that the averaged values may be compared with test data or may be used in other types of calculations. Software such as FIELD VIEW by INTELLIGENT LIGHT, INC., may be used to interpolate the values. Simulation software 124 coupled to interpolation module 122 uses the interpolated values in other simulation software. For example, store simulation software uses the values to determine how the flow field described by the values affects store 14 transported by aircraft 10 upon ejection from aircraft 10.

FIG. 3 is a flowchart illustrating a method for simulating a flow field. The method begins at step 212, where initial conditions for a flow field for aircraft 10 are received. Initial conditions are calculated from user input describing, for example, the velocity of aircraft 10. The initial conditions may be selected to increase the speed of the calculation by estimating the final solution. For example, the values for the velocity variables are initialized to zero in the open bay 12. Grid 20 is generated for open bay 12 at step 214. Grid generator 114 adjusts cells 22 such that cells 22 are appropriate for describing a flow field around aircraft 10. Grid 20 for open bay 12 may comprise, for example, approximately 1,000,000 cells 22.

At step 216, the method determines whether a time-accurate process or a time-warped process is to be used. The time-accurate process is used if an accurate simulation is required. The time-accurate process, however, requires more processing time and power. The time-warped process produces a less accurate simulation, but also uses less processing power and time. For example, time-accurate module 116 may require the use of fourteen processors and approximately 14,000 CPU hours, while time-warped module 118 may require the use of only eight processors and approximately 115 CPU hours.

If the time-accurate process is to be used at step 216, the method proceeds to step 218 to initiate the time-accurate flow field calculation. The values $q_{kt}$ for the variables $Q_k$ are determined at each time step, and recorded periodically, for example, every five (5) time steps in a plot file. A transient period is determined at step 220. The transient period is determined by examining the values. For example, the values of the pressure variable may spike during the transient period, and then become relatively steady after the transient period. The transient period may last for 1000 to 2000 time steps, for example.

After passing the transient period, the flow field calculation is continued at step 222. At step 224, the method determines whether a predetermined number of recording periods, for example, 200 to 400 periods have passed. If a predetermined number of periods have not passed, the method returns to step 222 to continue the flow field calculation. If the predetermined number of periods have passed, the method proceeds to step 226 where the recorded values are averaged. For example, values from 200 to 400 periods are averaged.

After averaging the recorded values, the method proceeds to step 227 to determine whether a predetermined final period has been reached. The final period signals the end of calculating the values. If the final period has not been reached, the method returns to step 222 to continue the flow field calculation. If the final period has been reached, the method proceeds to step 228 to interpolate the averaged values. Interpolation module 122 adjusts the values as calculated for grid 20 to values associated with a survey grid in order to compare the results with test data at step 229. Other suitable operations may be performed on the interpolated values. For example, the values may be used in other simulation process.

If a time-warped process is to be used at step 216, the method proceeds to step 230 to initiate the time-warped flow field calculation. The values $q_{kt}$ for the variables $Q_k$ are determined at each step, and recorded at each period, for example, every fifty (50) time steps, in a plot file. A transient period is determined at step 232. The transient period is determined by animating the flow field from the plot files to illustrate the values. For example, the values spike during the transient period and then become steady after the transient period. The transient period may last for approximately 2000 time steps, for example.

After passing the transient period, the flow field calculation is continued at step 234. At step 236, the method determines whether a predetermined number of recording periods, for example, 30 to 40 periods, have passed. If a predetermined number of periods have not passed, the method returns to step 234 to continue the flow field calculation. If the predetermined number of periods have passed, the method proceeds to step 238 where the recorded values are averaged. For example, values from approximately 30 to 40 periods are averaged.

After averaging the recorded values, the method proceeds to step 239 to determine whether a final period has been reached. If the final period has not been reached, the method returns to step 234 to continue the flow field calculation. If the final period has been reached, the method proceeds to step 240 to interpolate the averaged values. Interpolation module 122 adjusts the values as calculated for grid 20 to values associated with a survey grid in order to be able to use the values with other simulation software or to perform other operations on the results.

At step 240, the interpolated values are used in other simulation software. For example, the values are used in store simulation software in order to determine how the flow field described by the values affects store 14 in bay 12 of aircraft 10. Other suitable operations may be performed on the values. For example, the values may be compared with test data. After using the values in the other simulation software, the method terminates.

Although embodiments of the invention and its advantages are described in detail, a person skilled in the art could make various alterations, additions, and omissions without departing from the spirit and scope of the present invention as defined by the appended claims.

What is claimed is:

1. A method for simulating a flow field, the method comprising:
   receiving a set of user inputs associated with a flow field;
   electronically determining a set of initial conditions for the flow field based at least on the received set of user inputs;
   electronically generating a grid comprising a plurality of cells, each cell associated with a set of variables describing a portion of the flow field at that cell;
   at each of a predetermined plurality of steps, using a computerized computational fluid dynamics (CFD) solver to calculate a value for each variable associated with each cell based at least on a previous value calculated at the previous step for that variable associated with that cell by applying a flow field function to the previous value, at least a portion of the calculated values being calculated based at least on the set of electronically determined initial conditions;
   electronically recording the values calculated at periodic ones of the plurality of steps such that the values calculated at only a portion of the steps are recorded;
   electronically averaging the values recorded at the periodic steps for each variable of each cell to yield an averaged value for each variable; and
   determining the flow field from the averaged values.

2. The method of claim 1, wherein the grid describes a bay of an aircraft.

3. The method of claim 1, further comprising determining a transient period for the values.

4. The method of claim 1, wherein the flow field function comprises a Navier-Stokes function.

5. The method of claim 1, wherein:
   each period comprises a plurality of steps; and
   calculating the value for each variable of each cell comprises:
      computing the value for each variable of each cell at each step; and
      recording the value at a predetermined number of steps.

6. The method of claim 1, wherein the periods for the cells are substantially equivalent.

7. The method of claim 1, wherein a larger cell has a period less than a period for a smaller cell.

8. The method of claim 1, further comprising:
adjusting the averaged values to a survey grid; and
applying a simulation process to the adjusted values.

9. The method of claim 1, wherein the set of variables comprises at least one velocity variable, a pressure variable, and a temperature variable.

10. The method of claim 1, wherein the set of variables comprises at least one momentum variable, a density variable, and an energy variable.

11. A method for simulating a flow field, the method comprising:
receiving a set of user inputs associated with a flow field;
electronically determining a set of initial conditions for the flow field based at least on the received set of user inputs;
electronically generating a grid comprising a plurality of cells, each cell associated with a set of variables describing a portion of the flow field at that cell;
at each of a predetermined plurality of periods, calculating a value for each variable associated with each cell based at least on a previous value calculated at the previous period for that variable associated with that cell by applying a Navier-Stokes function to the previous value, at least a portion of the calculated values being calculated based at least on the set of electronically determined initial conditions, wherein a larger cell has a period less than a period for a smaller cell;
electronically recording the values calculated at periodic ones of the plurality of steps such that the values calculated at only a portion of the steps are recorded;
electronically averaging the values recorded at the periodic steps for each variable of each cell to yield an averaged value for each variable;
adjusting the averaged values to a survey grid; and
applying a simulation process to the adjusted values.

12. The method of claim 11, wherein the grid describes a bay of an aircraft.

13. The method of claim 11, further comprising determining a transient period for the values.

14. The method of claim 11, wherein:
each period comprises a plurality of steps; and
calculating the value for each variable of each cell comprises:
computing the value for each variable of each cell at each step; and
recording the value at a predetermined number of steps.

15. The method of claim 11, wherein the set of variables comprises at least one velocity variable, a pressure variable, and a temperature variable.

16. The method of claim 11, wherein the set of variables comprises at least one momentum variable, a density variable, and an energy variable.

17. A system for simulating a flow field, the system comprising:
a grid generator electronically generating a grid comprising a plurality of cells, each cell associated with a set of variables describing a portion of the flow field at that cell;
a flow field module coupled to the grid generator, the flow field module using a computerized computational fluid dynamics (CFD) solver to calculates at each of a predetermined plurality of steps, a value for each variable associated with each cell based at least on a previous value calculated at the previous step for that variable associated with that cell;
a recording module operable to electronically record the values calculated at periodic ones of the plurality of steps such that the values calculated at only a portion of the steps are recorded; and
an averaging module coupled to the flow field module, the averaging module electronically averaging the values recorded at the periodic steps for each variable to yield an averaged value for each variable.

18. The system of claim 17 wherein the flow field module calculates a value for each variable by applying a flow field function to the previous value.

19. The system of claim 18, wherein the flow field function comprises a Navier-Stokes function.

20. The system of claim 17, wherein the periods for the cells are substantially equivalent.

21. The system of claim 17, wherein a larger cell has a period less than a period for a smaller cell.

22. The system of claim 17, further comprising:
an interpolation module coupled to the averaging module, the interpolation module adjusting the averaged values to a survey grid; and
a simulation module coupled to the interpolation module, the simulation module applying a simulation process to the adjusted values.

23. A system for simulating a flow field, the system comprising:
a grid generator electronically generating a grid comprising a plurality of cells, each cell associated with a set of variables describing a portion of the flow field at that cell;
a flow field module coupled to the grid generator, the flow field module calculating, at each of a predetermined plurality of periods, a value for each variable associated with each cell based at least on a previous value calculated at the previous period for that variable associated with that cell by applying a Navier-Stokes function to the previous value, at least a portion of the calculated values being calculated based at least on the set of electronically determined initial conditions, wherein a larger cell has a period less than a period for a smaller cell;
an averaging module coupled to the flow field module, the averaging module electronically averaging the values recorded at the periodic steps for each variable to yield an averaged value for each variable;
an interpolation module coupled to the averaging module, the interpolation module adjusting the averaged values to a survey grid; and
a simulation module coupled to the interpolation module, the simulation module applying a simulation process to the adjusted values.

* * * * *